No. 686,605. Patented Nov. 12, 1901.
E. L. GRAUEL & S. H. GALLAGHER.
AUTOMATIC TENSION COUPLING AND SOUND DEADENER.
(Application filed June 24, 1901.)
(No Model.)
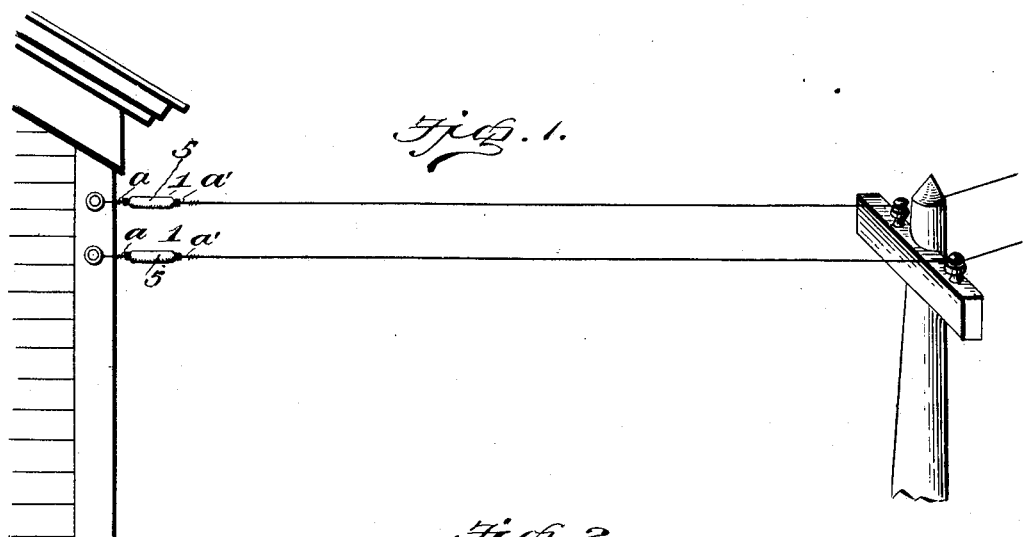
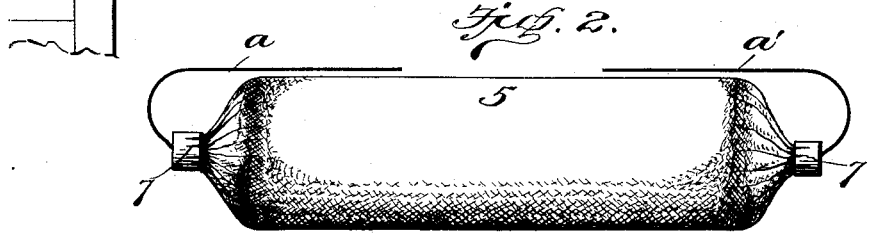
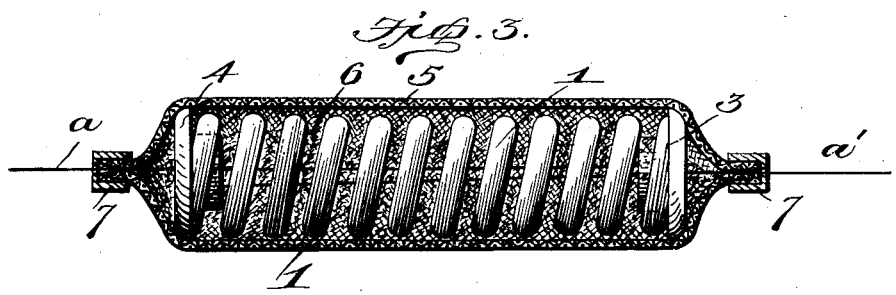
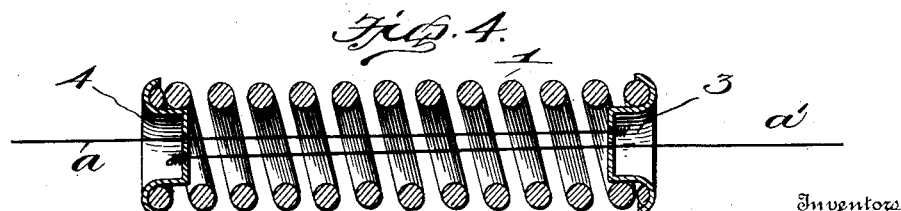
Witnesses
Inventors:
S. H. Gallagher
E. L. Grauel
By Attorneys

UNITED STATES PATENT OFFICE.

EDWIN LORAINE GRAUEL AND STEPHEN HENRY GALLAGHER, OF CARTHAGE, NEW YORK.

AUTOMATIC TENSION-COUPLING AND SOUND-DEADENER.

SPECIFICATION forming part of Letters Patent No. 686,605, dated November 12, 1901.

Application filed June 24, 1901. Serial No. 65,844. (No model.)

*To all whom it may concern:*

Be it known that we, EDWIN LORAINE GRAUEL and STEPHEN HENRY GALLAGHER, citizens of the United States, residing at Carthage, in the county of Jefferson and State of New York, have invented certain new and useful Improvements in Automatic Tension-Couplings and Sound-Deadeners; and we do declare the following to be a full, clear, and exact description of the invention, such as will enable others skilled in the art to which it appertains to make and use the same.

The invention relates to an automatic tension-coupling and sound-deadener for electric wires.

The object of the invention is to provide a simple, durable, and comparatively inexpensive device of this character which will automatically compensate for the expansion and contraction of wires and which will also obviate the humming of electric line-wires in general and telephone and telegraph wires in particular due to mechanical vibration.

With this and other objects in view the invention consists of certain novel features of construction, combination, and arrangement of parts, which will be hereinafter more fully described, and particularly pointed out in the appended claims.

In the accompanying drawings, Figure 1 illustrates two line-wires and the application of our invention thereto. Fig. 2 is an enlarged side elevation of the device removed. Fig. 3 is a longitudinal vertical sectional view. Fig. 4 is a similar view with the outer casing and sound-deadening agent removed.

Referring to the drawings, $a$ $a'$ denote the contiguous ends of a line-wire, and 1 denotes a coupling which consists of a coiled spring having located at its ends and in electrical contact therewith cup-shaped caps 3 and 4. The end $a'$ of the wire passes through an aperture in the cap 3, through the coils of the spring, through an aperture in the cap 4, and is knotted or otherwise secured to this cap, while the end $a$ of the wire passes through an aperture in the cap 4, through the coils of the spring, through an aperture in the cap 3, and is knotted or otherwise secured to said cap 3, the parts being electrically connected, so that a current may pass through the wire the same as if its ends were directly connected. This form of coupling is particularly desirable in that it is entirely automatic and by its employment the turnbuckles usually used may be entirely dispensed with.

To prevent the humming noise due to the vibration of the wire, we have discovered that by suitably inclosing the coupling within a casing 5 of, for instance, textile material and stuffing said casing with asbestos or similar packing 6 the objectionable sounds are entirely neutralized or absorbed. The ends of the casing are closed in any suitable manner— as, for instance, by metallic caps 7.

From the foregoing description, taken in connection with the accompanying drawings, the construction, mode of operation, and advantages of our invention will be readily understood without requiring a more extended explanation.

Various changes in the form, proportion, and details of construction may be made within the scope of the invention without departing from the spirit or sacrificing any of the advantages thereof.

Having thus described our invention, what we claim, and desire to secure by Letters Patent, is—

1. In a device of the character described, the combination with a coil-spring, of caps electrically connected thereto, and conductor-wires connected to said caps and extending in opposite directions through said spring, thus serving to hold said caps in electrical contact with said spring, substantially as set forth.

2. In a device of the character described, the combination with a coiled spring, of caps electrically connected to the ends thereof, a casing surrounding said coiled spring, a packing within said casing arranged between the coils of said spring and entirely filling the casing, substantially as set forth.

3. In a device of the character described, the combination with a coiled spring, of cup-shaped caps electrically connected to the ends thereof, wires, the end of one wire passing through the cap at one end, through the coils of the spring and electrically connected to the cap at the opposite end, and the end of the other wire passing in the opposite direction through said cap, through the coils of the spring and likewise electrically connected to the opposite cap, substantially as set forth.

In testimony whereof we have hereunto set our hands in presence of two subscribing witnesses.

EDWIN LORAINE GRAUEL.
STEPHEN HENRY GALLAGHER.

Witnesses:
 HENRY BRODY,
 A. I. BAILEY.